United States Patent
Endoh et al.

(10) Patent No.: US 8,665,688 B2
(45) Date of Patent: Mar. 4, 2014

(54) OPTICAL DEVICE, METHOD OF MANUFACTURING THE SAME, REPLICA SUBSTRATE FOR PRODUCING OPTICAL DEVICE, AND METHOD OF PRODUCING THE SAME

(75) Inventors: Sohmei Endoh, Miyagi (JP); Kazuya Hayashibe, Miyagi (JP)

(73) Assignee: Sony Corporation, Tokyo (JP)

( * ) Notice: Subject to any disclaimer, the term of this patent is extended or adjusted under 35 U.S.C. 154(b) by 1068 days.

(21) Appl. No.: 12/013,048

(22) Filed: Jan. 11, 2008

(65) Prior Publication Data

US 2008/0180824 A1 Jul. 31, 2008

(30) Foreign Application Priority Data

Jan. 18, 2007 (JP) ................................ 2007-009628

(51) Int. Cl.
*G11B 7/24* (2013.01)

(52) U.S. Cl.
USPC ..................................................... 369/275.4

(58) Field of Classification Search
None
See application file for complete search history.

(56) References Cited

U.S. PATENT DOCUMENTS

| | | | | |
|---|---|---|---|---|
| 4,811,331 A | * | 3/1989 | Gerber | 369/275.4 |
| 5,060,223 A | * | 10/1991 | Segawa | 369/275.4 |
| 6,677,703 B2 | | 1/2004 | Ito et al. | |
| 6,965,555 B2 | * | 11/2005 | Ueki | 369/275.4 |
| 7,005,246 B2 | | 2/2006 | Nagasaka et al. | |
| 7,297,386 B2 | | 11/2007 | Suzuki et al. | |
| 7,633,045 B2 | * | 12/2009 | Endoh et al. | 250/216 |
| 2002/0145960 A1 | * | 10/2002 | Worthington et al. | 369/47.48 |
| 2004/0081069 A1 | * | 4/2004 | Suenaga et al. | 369/275.4 |
| 2004/0202096 A1 | * | 10/2004 | Nakajima et al. | 369/275.4 |
| 2005/0128930 A1 | * | 6/2005 | Suenaga et al. | 369/275.4 |
| 2006/0093964 A1 | * | 5/2006 | Nagasaka et al. | 430/311 |
| 2006/0164965 A1 | * | 7/2006 | Matsuda et al. | 369/275.4 |
| 2007/0144700 A1 | | 6/2007 | Kobayashi et al. | |

FOREIGN PATENT DOCUMENTS

| | | |
|---|---|---|
| JP | 10-074322 | 3/1998 |
| JP | 2003-004916 | 1/2003 |
| JP | 2003-114316 | 4/2003 |
| JP | 2003-131390 | 5/2003 |
| JP | 2003-240904 | 8/2003 |
| JP | 2003-322705 | 11/2003 |

(Continued)

OTHER PUBLICATIONS

Leading-Edge Key Technology Product Information, NTT-AT Official, website, <http://keytech.ntt-at.co.jp/nano/prd_0016.html> printed on Nov. 16, 2007, 3 pages.

Japanese Patent Office, Notification of reasons for refusal issued in connection with Japanese Patent Application No. 2010-087396, dated Nov. 6, 2012. (3 pages).

(Continued)

*Primary Examiner* — Joseph Haley
*Assistant Examiner* — Emily Frank
(74) *Attorney, Agent, or Firm* — K&L Gates LLP

(57) ABSTRACT

An optical device, a method of manufacturing the optical device, a replica substrate for manufacturing the optical device, and a method of producing the replica substrate are disclosed. The optical device includes a base, and a plurality of structures arranged at a fine pitch equal to or shorter than a wavelength of visible light on a surface of the base. Each of the structures is composed of protuberance. The structures have a depth distribution.

19 Claims, 18 Drawing Sheets

(56) References Cited

FOREIGN PATENT DOCUMENTS

| | | |
|---|---|---|
| JP | 2004-069878 | 3/2004 |
| JP | 2005-031538 | 2/2005 |
| JP | 2006-038928 | 2/2006 |
| JP | 2006-185562 | 7/2006 |
| JP | 2006-201371 | 8/2006 |
| JP | 2006-251318 | 9/2006 |
| JP | 4539657 | 9/2010 |
| WO | 2005/092588 | 10/2005 |

OTHER PUBLICATIONS

Japanese Patent Office, Notification of reasons for refusal issued in connection with Japanese Patent Application No. 2009-040027, dated Oct. 2, 2012. (4 pages).

Japanese Patent Office, Office Action issued in connection with Japanese Patent Application No. 2010-087396, dated Mar. 19, 2013, (4 pages).

Japanese Office Action issued Jul. 2, 2013 for corresponding Japanese Patent Application No, 2010-087396.

* cited by examiner

FIG. 1A
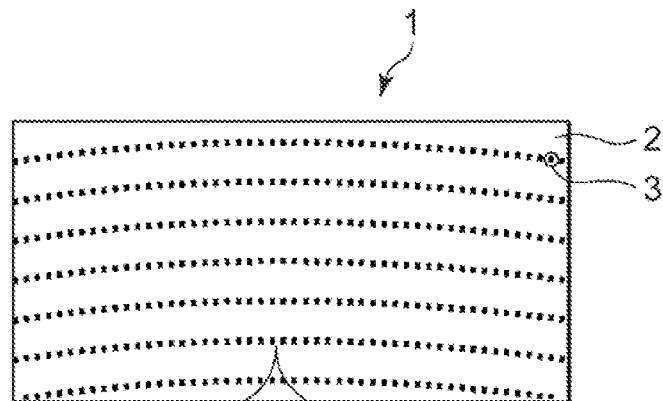
FIG. 1B
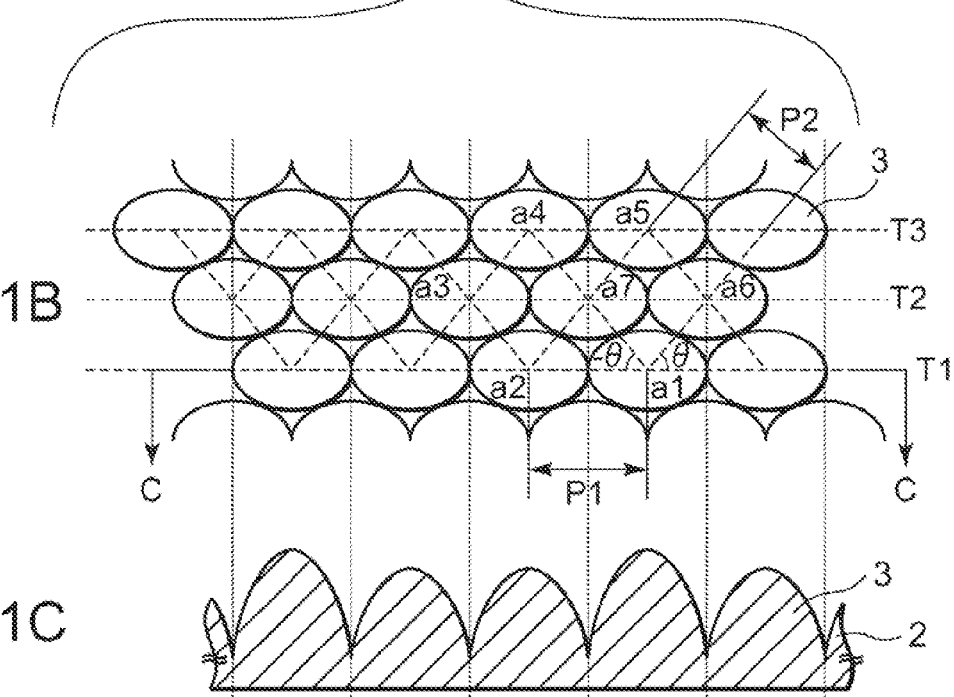
FIG. 1C
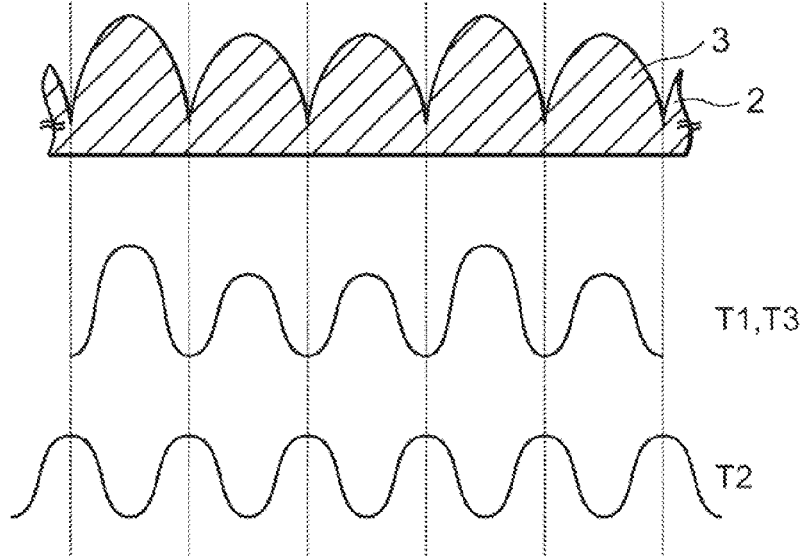
FIG. 1D

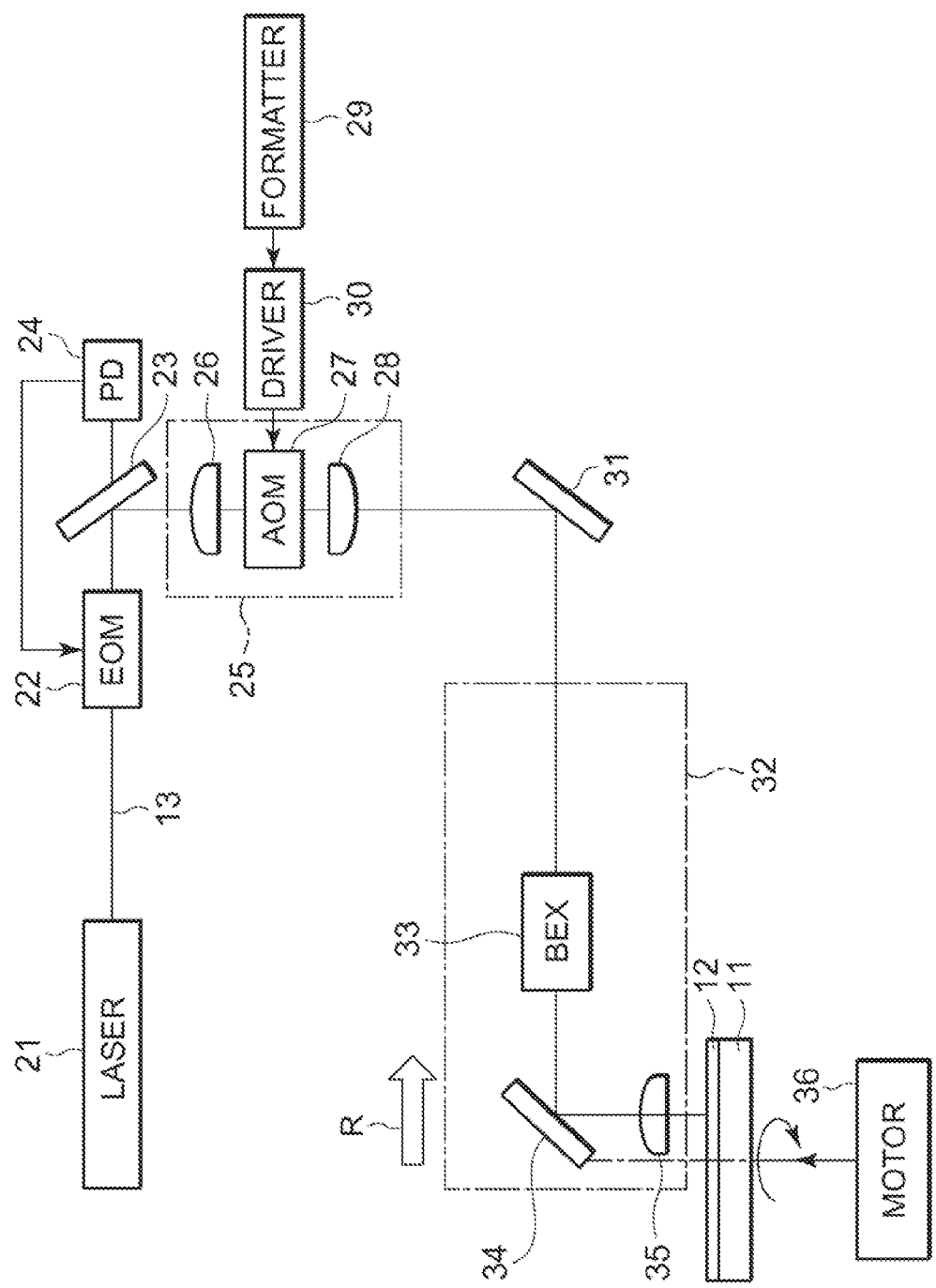

OPTICAL DEVICE, METHOD OF MANUFACTURING THE SAME, REPLICA SUBSTRATE FOR PRODUCING OPTICAL DEVICE, AND METHOD OF PRODUCING THE SAME

CROSS REFERENCES TO RELATED APPLICATIONS

The present application claims benefit of priority of Japanese patent Application No. 2007-9628 filed in the Japanese Patent Office on Jan. 18, 2007, the entire contents of which are incorporated herein by reference.

BACKGROUND

The present application relates to an optical device, a method of manufacturing the same, a replica substrate for producing the optical device, and a method of producing the same. More specifically, the present application relates to an optical device having a plurality of structures each composed of protuberance or pit provided on a base surface.

In the field of optical devices using transparent substrates such as those made of glass and plastic, there has been known a technique of reducing light reflected on the surface, and of improving the transmission characteristics, such as forming a fine and dense pits and protuberances (sub-wavelength structure; "moth-eye" structure) on the surfaces of optical devices. When the sub-wavelength structure, having a periodicity of as large as wavelength of visible light or around, is provided to the surface of optical devices, light passing therethrough is generally diffracted, and thereby the transmitted light largely reduces straightly-propagating components. On the contrary, no diffraction would occur when the pitch of the sub-wavelength structure is shorter than the wavelength of light to be transmitted therethrough. For an exemplary case where each sub-wavelength structure is composed of a cone having a depressed cone surface, an effective anti-reflective effect and excellent transmission characteristics may be obtained with respect to light having a single wavelength corresponded to the pitch and depth thereof.

In the paragraphs below, a shape characterized by a cone surface depressed in a form of pit will be referred to as "tent-form", and a shape characterized by a swelled cone surface in a form of protuberance will be referred to as "bell-form" or "bell-type".

The optical device having the above-described, tent-form sub-wavelength structures may be manufactured as follows. First, a pattern of pits and protuberances is formed on a photoresist on a Si substrate by electron beam recording, and the Si substrate is then etched through the pits and protuberances photoresist pattern used as a mask. As a result, tent-form sub-wavelength microstructures (approximately 300 nm in pitch, approximately 400 nm in depth) are formed on the surface of the substrate, and whereby a Si master disc is formed (see FIG. 18). The microstructures are provided to a tetragonal lattice pattern or a hexagonal lattice pattern.

In the Si master disc produced as described above, anti-reflective effect may be obtained over a wide range of wavelength of light. In particular, for an exemplary case where tent-form sub-wavelength microstructures provided according to the hexagonal lattice pattern as shown in FIG. 19, an advanced anti-reflective effect (reflectivity of 1% or lower) may be obtained over the visible region (see FIG. 20). Reference numerals $I_1$, $I_2$ in FIG. 20 represent reflectivities of flat portion and patterned portion of the Si master disc, respectively.

Next, a Ni-plated stamper of the manufactured Si master disc is manufactured (see FIG. 21). As shown in FIG. 22, on the surface of the stamper, pits and protuberances patterned which is complementary to those on the Si master disc are formed. Next, the pits and protuberances pattern are transferred to a transparent resin such as polycarbonate using the stamper. By this process, a desired optical device (replica substrate) may be obtained. Also this optical device may successfully achieve an advanced anti-reflective effect (reflectivity of 0.3% or below) (see FIG. 23). Reference numerals $I_3$, $I_4$ in FIG. 23 represent reflectivity measured in the absence of the pattern, and in the presence of the pattern, respectively.

The optical device having the tent-form sub-wavelength, however, suffers from a problem in that the reflectivity increases in the longer wavelength region (700 nm to 800 nm), as shown in FIG. 23.

SUMMARY

Accordingly, it is desirable to provide an optical device having excellent anti-reflective characteristics, a method of producing the same, a replica substrate for producing the optical device, and a method of producing the same according to an embodiment.

The present application is based on experiments conducted by the inventors as detailed below.

The present inventors conducted investigation into suppression of increase in the reflectivity in the longer wavelength region (700 nm to 800 nm), and finally found out that, by adopting bell-form elliptic cone shape or truncated elliptic cone shape to the sub-wavelength structure, a sufficient level of non-reflective effect may be obtained, and increase in the reflectivity in the longer wavelength region (700 nm to 800 nm) may be suppressed.

After such investigations into the optical device having sub-wavelength structures having the elliptic cone shape or truncated elliptic cone shape, the present inventors also found out that the optical device shows a wavelength dependence of reflectivity expressed by a sine-wave shape with an extremely small amplitude, as the wavelength increases. Considering future demands on further improvement in the anti-reflective effect, it may be preferable to reduce the above-described wavelength dependence of reflectivity described in the above.

The present inventors then conducted investigations directed to reducing the above-described wavelength dependence, and finally found out that the wavelength dependence may be reduced by providing sub-wavelength structures having a depth distribution on the optical device.

In accordance with a first aspect of the present application, there is provided an optical device including a base and a plurality of structures arranged at a fine pitch equal to or shorter than a wavelength of visible light, each structure being composed of a protuberance or pit, in which the structures have a depth distribution.

In accordance with a second aspect of the present application, there is provided a replica substrate for manufacturing an optical device including a base and a plurality of structures arranged at a fine pitch equal to or shorter than a wavelength of visible light, each structure being composed of a protuberance or pit, in which the structures have a depth distribution.

In accordance with a third aspect of the present application, there is provided a method of producing a replica substrate for producing an optical device including a base and a plurality of protuberances or pits arranged at a fine pitch equal to or shorter than a wavelength of visible light. The method includes:

providing a substrate having a resist layer formed on the surface; intermittently irradiating the resist layer with laser beam while rotating the substrate and relatively moving the laser beam in the radial direction of the rotation of the substrate to form a latent image in the resist layer at a pitch shorter than a wavelength of visible light; developing the resist layer to form
a resist pattern having a depth distribution on the surface of the substrate; subjecting the substrate having the developed resist layer to etching process using the resist pattern as a mask to form pits and protuberances on the surface of the substrate; and producing a replica substrate by transferring the pits and protuberances In accordance with a fourth aspect of the present application, there is provided a method of manufacturing an optical device including a base and a plurality of protuberances or pits arranged at a fine pitch equal to or shorter than a wavelength of visible light. The method includes: providing a substrate having a resist layer formed on the surface; intermittently irradiating the resist layer with laser beam while rotating the substrate and relatively moving the laser beam in the radial direction of the rotation of the substrate to form a latent image in the resist layer at a pitch not longer than a wavelength of visible light; subjecting the substrate having the developed resist layer to etching process using the resist pattern as a mask to form a resist pattern having a depth distribution on the surface of the substrate; producing a replica substrate of the substrate, and forming a metal plated layer on the pits and protuberances of the replica substrate; stripping off the metal plated layer from the replica substrate to produce a molding die having the pits and protuberances transferred thereon; and forming a transparent base having the pits and protuberances formed on the surface thereof using the molding die.

In the first and second aspects of the present application, each structure may an elliptic cone or truncated elliptic cone shape having a moderate slope at and around the top and gradually steeping toward the bottom.

In the first and second aspects of the present application, the structures may be arranged to form a plurality of arc track rows on the surface of the base. In this case, the elliptic cone or truncated elliptic cone shape may have a major axis in a circumferential direction of the tracks. The structures may form a quasi-hexagonal lattice pattern in adjacent tracks.

In the first and second aspects of the present application, an arrangement pitch P1 of the structures in the same track may be longer than an arrangement pitch P2 of the structures in two adjacent tracks.

In the first and second aspects of the present application, the structures in the circumferential direction of the arc tracks may have a depth smaller than that of the structures in the radial direction of the arc tracks.

In the first and second aspects of the present application, the depth distribution of the structures may be provided by varying in a selective manner using at least two or more values, in a continuous manner, or in a sectionally continuous manner, over the surface of the substrate.

In the first and second aspects of the present application, the depth distribution of the structures may be provided by varying in a step function, over the surface of the substrate.

In the first and second aspects of the present application, the depth distribution of the structures may be provided by varying in a step function over the surface of the substrate, and the structure may selectively formed so that ratio of population of at least one or more types of structures differs from ratio of population of the other types of structures.

In the latent image forming step in the third and fourth aspects of the present application, the latent images in the adjacent tracks may be formed to form a quasi-hexagonal lattice pattern.

In the pits and protuberances forming step in the third and fourth aspects of the present application, the step may include repeatedly performing an etching process through the resist pattern used as a mask and an ashing process of the resist patter, while gradually lengthening the etching time.

In the replica substrate forming step in the third and fourth aspects of the present application, the photo-curing resin layer may be formed on the surface of the substrate, and then the photo-curing resin layer may be stripped off.

In the third and fourth aspects of the present application, the laser beam may be modulated into a sawtooth wave or triangle wave having the amplitude thereof varying in a periodical or non-periodical manner.

In the third and fourth aspects of the present application, the laser beam may be modulated into a rectangular wave having the amplitude thereof varying in a periodical or non-periodical manner.

In the third and fourth aspects of the present application, the laser beam may be modulated into a rectangular wave having the amplitude thereof varying in a periodical or non-periodical manner, and having the time axis thereof varying in a periodical or non-periodical manner.

In the third and fourth aspects of the present application, the laser beam may be modulated into a multi-valued step wave.

In the third and fourth aspects of the present application, the laser beam may be modulated into a selective multi-valued step wave.

In the third and fourth aspects of the present application, the laser beam is preferably modulated into a sectionally continuous wave.

As has been described in the above, the present application may successfully reduce the wavelength dependence of reflection characteristics, by virtue of provision of the structures having a depth distribution to the optical device. As a consequence, the optical device excellent in the anti-reflection characteristics may be realized.

Additional features and advantages are described herein, and will be apparent from, the following Detailed Description and the figures.

BRIEF DESCRIPTION OF THE FIGURES

FIGS. 1A to 1D are schematic drawings showing an exemplary configuration of the optical device according to one embodiment;

FIG. 5 is a schematic drawing showing a configuration of an exposure apparatus used for manufacturing process of the master disc;

DETAILED DESCRIPTION

The present application will be described in further detail below with reference to the drawings according to embodiments.

(Configuration of Optical Device)

Figure 2:
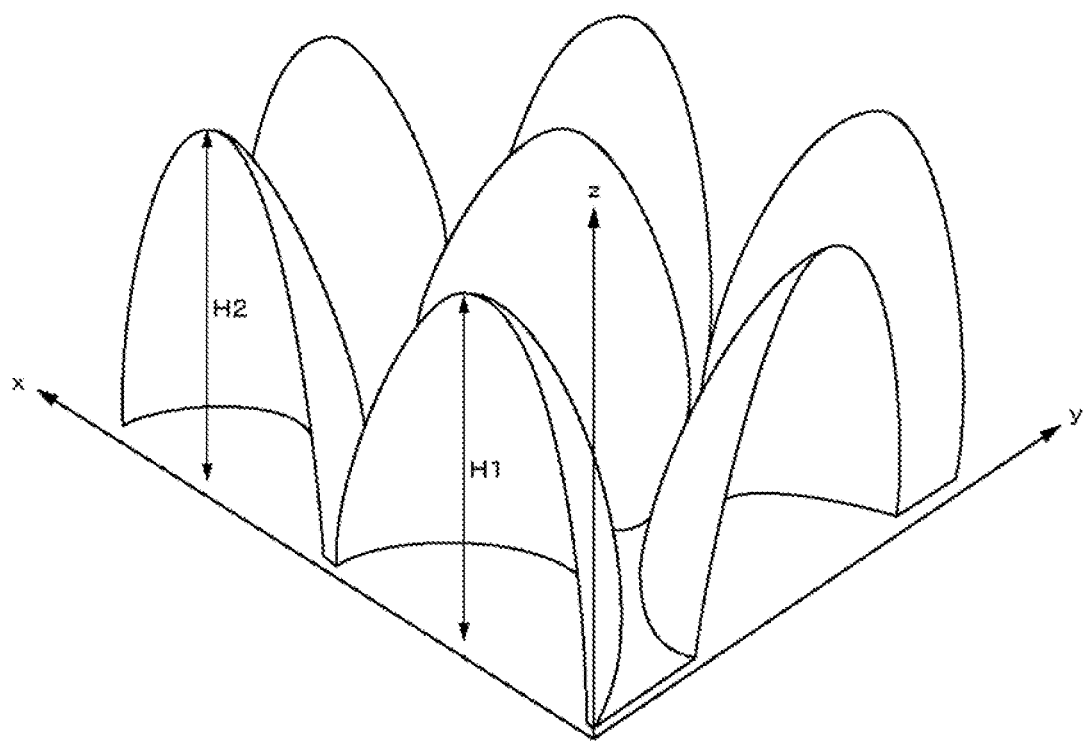
FIG. 2 is an enlarged perspective view showing a portion of the optical device shown in FIG. 1.

FIG. 1A is a schematic plan view showing an exemplary configuration of an optical device 1 according to an embodiment. FIG. 1B is an enlarged plan view of a part of the optical device 1 shown in FIG. 1A. FIG. 1C is a sectional view taken along line C-C in FIG. 1B. FIG. 1D is a schematic line drawing showing waveforms of modulated laser beam used for patterning latent images corresponded to structures 3 shown in FIG. 1B. FIG. 2 is an enlarged perspective view showing a part of the optical device 1 shown in FIG. 1.

The optical device 1 according to this embodiment is configured to have a plurality of structures 3, each composed of a protuberance, provided to the surface of a base 2 at a fine pitch equal to or shorter than a wavelength of visible light (approximately 400 nm) described later. The optical device 1 prevents reflection of light, transmitted through the base 2 in the direction of –Z in FIG. 2, on the interface between the structures 3 and the ambient air.

The optical device 1 is preferably adoptable to various optical devices such as display, optoelectronics, optical communication (optical fiber), solar cell, lighting device and so forth, and more specifically adoptable to optical fiber, light guiding plate for displays and so forth, available in various wavelength ranges.

The base 2 is a transparent base showing transmissivity, composed of transparent synthetic resins such as polycarbonate (PC) and polyethylene terephthalate (PET), or glass, and the like. The shape of the base 2 is selected depending on, for example, the main unit of the above-described various optical devices, and shape of anti-reflective functional components in a form of sheet or film, attached to these optical devices. The shape is exemplified by those of film, sheet, plate, block and so forth.

The structures 3 have a depth distribution. The depth distribution herein means that the structures 3 having two or more levels of height are provided to the surface of the base 2. More specifically, the structures 3 having a reference height and the structures 3 having a height different from that of the structures 3 are provided to the surface of the base 2. For example, as shown in FIG. 2, the structures 3 having height H1 and structures 3 having height H2 are provided to the surface of the base 2. The structures having a height different from the reference height are provided to the surface of the base 2 in a periodical or non-periodical (random) manner. The direction of the periodicity is exemplified by circumferential direction, radial direction, or ±θ direction away from the circumferential direction.

The structures 3 are formed to be integrated with the base 2, for example. The structures 3 herein has an identical shape, but not limited thereto. The structures 3 are formed, for example, as cone structures, the bottom of which having an elliptic, oblong, or egg shape having a long axis and a short axis, and the top of which is formed in a curved or flat shape. In particular, each structure preferably has an elliptic cone shape or a truncated elliptic cone shape having the slope thereof moderate at and around the top, and gradually increasing towards the bottom (see FIG. 2). This is because increase in the reflectivity in the lower wavelength region (700 nm to 800 nm) may successfully be suppressed.

Each of the structures 3 are provided to be aligned in a plurality of arc tracks T1, T2, T3, □ □ □ (also generally referred to as "track T", hereinafter) on the surface of the base 2, as shown in FIG. 1A. The structures 3 are preferably provided so that, in the adjacent two tracks T, the structures 3 aligned in one track (T1, for example) are positioned at the middle positions (positions shifted by a half pitch) of the structures 3 aligned in the other track (T2, for example). More specifically, as shown in FIG. 1B, the individual structures 3 in three adjacent tracks (T1 to T3) are preferably provided so as to form a quasi-hexagonal lattice pattern having the centers of the structures fallen on individual points a1 to a7. This is because the packing density of the structures 3 can be maximized on the surface of the base 2. The quasi-hexagonal lattice pattern herein means a hexagonal lattice pattern distorted along the arc of the tracks T, unlike the normal hexagonal lattice pattern.

The individual structures 3 in the same track may be provided at regular arrangement pitches P1 (distance a1-a2), in which arrangement pitch P1 is set to approximately 330 nm, for example. The individual structures 3 are provided also in the direction ±θ, which is approximately ±60° for example, away from the circumferential direction, at regular arrangement pitches P2 (distance a1-a7 (a2-a7)), in which the arrangement pitch P2 is set to approximately 300 nm, for example.

Furthermore, as shown in FIG. 1B, arrangement pitch P1 (distance a1-a2) of the individual structures 3 in the same track (T1, for example) may be set longer than the arrangement pitch of the structures 3 in two adjacent tracks (T1 and T2, for example), that is, arrangement pitch P2 (distances a1-a7, a2-a7) of the structures 3 in the direction approximately 160° away from the circumferential direction.

The depth (height) of the structures 3 is the order of 300 nm to 380 nm, for example. The depth of the structures 3 in the circumferential direction of the arc tracks T is set smaller than the depth of the structures in the radial direction of the arc tracks T. Aspect ratio (depth H/arrangement pitch (average period) P) of the structures 3 preferably falls in the range from 0.91 to 1.40, because an extremely excellent transmission characteristics may be obtained within this range.
(Method of Manufacturing Optical Device)

Next, an exemplary method of manufacturing thus-configured optical device will be explained. The method of manufacturing the optical device includes a step of manufacturing a master disc, a step of manufacturing a replica substrate, a step of manufacturing a molding die, a step of manufacturing an optical device, and a step of cutting. These steps will be explained one by one referring to FIG. 3A to FIG. 7B.
[Step of Manufacturing Master Disc]

Figure 3A:
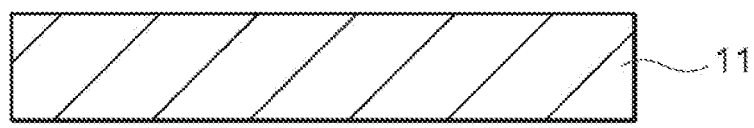
FIGS. 3A to 3C are schematic drawings explaining steps of manufacturing a master disc.
Figure 3B:
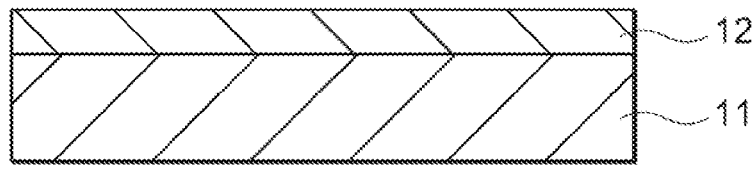

First, as shown FIG. 3A, a disc-like substrate 11 is provided. The substrate 11 is a quartz substrate. Next, as shown in FIG. 3B, a resist layer 12 is formed on the surface of the substrate 11. The resist layer 12 is composed of an organic resist, for example. Novolac-base resist or chemical amplification resist may be used as the organic resist.

Figure 3C:
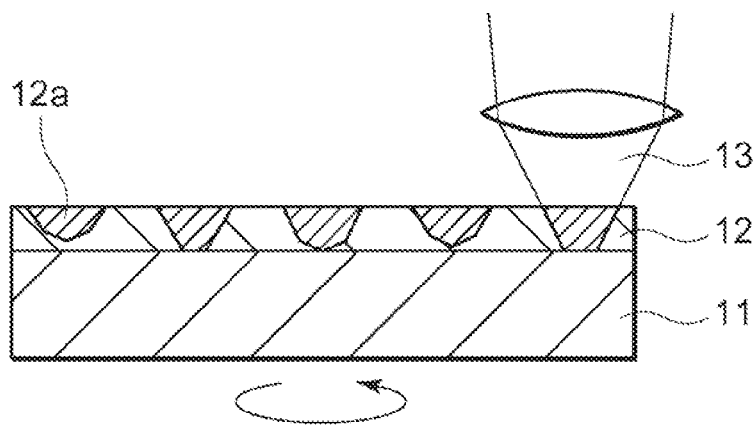

Next, as shown in FIG. 3C, laser beam (exposure beam) 13 is irradiated to the resist layer 12 while rotating the substrate 11. By intermittently irradiating the laser beam 13, while moving the laser beam 13 in the radial direction of the substrate 11, the resist layer 12 is irradiated over the entire surface thereof. By the exposure, latent images 12a corresponded to locus of the laser beam 13 are formed at a pitch equal to or shorter than a wavelength of visible light over the entire range of the resist layer 12. The laser beam 13 used herein may one having, for example, the wavelength thereof varying in a periodical or non-periodical (random) manner. As the shape of such waveform, sine wave, rectangular wave or sawtooth wave may be included. The step of light exposure will be detailed later.

In the step of light exposure, the structures (latent images) may preferably be provided according to a quasi-hexagonal lattice pattern among three adjacent tracks by varying, from track to track, periodicity in irradiation of the laser beam 13 to the resist layer. The periodicity of irradiation of the laser beam 13 may be controlled by optimizing pulse frequency of the laser beam 13 so as to make the arrangement pitch P1 of the structures 3 in the circumferential direction constant, while rotating the substrate 11 at a constant angular velocity. More specifically, the laser beam 13 is modulated so as to shorten the periodicity of irradiation of laser beam 13, as position of the track becomes more distant from the center of the substrate. By this process, a nano-pattern having a spatial frequency uniform over the entire surface may be formed.

Figure 4A:
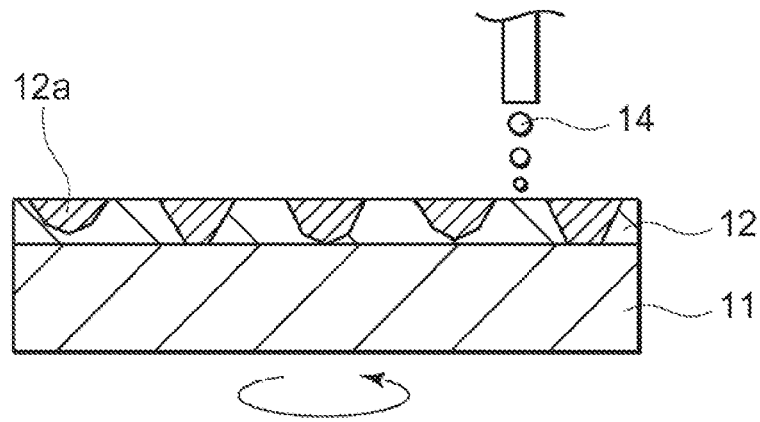
FIGS. 4A to 4C are schematic drawings explaining steps of manufacturing a master disc.
Figure 4B:
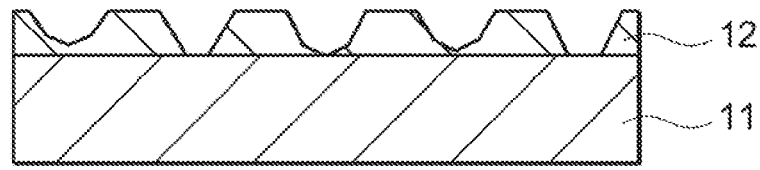

Next, a developing solution 14 is dropped on the resist layer 12, while rotating the substrate 11, to thereby develop the resist layer 12 as shown in FIG. 4A. By this process, a resist pattern having a depth distribution may be formed in the resist layer 12. For the case where the resist layer 12 is formed using a positive resist, portions exposed by the laser beam 13 are increased in the dissolution speed as compared with non-exposed portions, so that, as shown in FIG. 4B, a pattern corresponded to the exposed portions (latent images 12a) is formed in the resist layer 12.

Figure 4C:
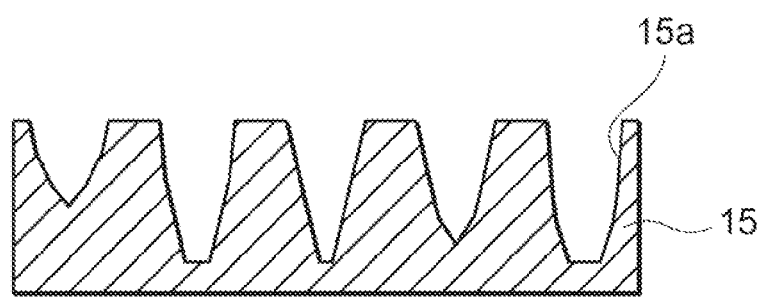

Next, the surface of the substrate 11 is etched, through the pattern of the resist layer 12 (resist pattern) used as a mask. By this process, as shown in FIG. 4C, pitted patterns 15a with a depth distribution are formed in one main surface of the substrate 11, and thereby a master disc 15 is produced. The etching is processed by dry etching, for example. By alternative repetition of etching and ashing in this process, a pattern of bell-like conical pits 15a may be formed, and a master disc having the depth three times or more as large as the thickness of the resist layer 12 may be manufactured. Thus, the aspect ratio of the structures 3 larger may be obtained.

By developing the latent images 12a, and by etching the substrate 11 through the obtained resist pattern used as a mask as described in the above, the structures 3 having a truncated elliptic cone shape, such as having the longitudinal direction thereof aligned in the circumferential direction of the arc tracks, may be obtained. In particular, the structures 3 having the truncated elliptic cone shape are preferably those having the slope at the center steeper than the slope at the bottom. This is because such shape may improve the durability and transferability. It is also possible to obtain a quasi-hexagonal lattice pattern, characterized in that arrangement pitch P1 of the structures in the same track is longer than arrangement pitch P2 of the structures between two adjacent tracks or the like and this contributes to further improvement in the packing density of the structures.

The master disc 15 shown in FIG. 4C may be produced by these processes. The master disc 15 is an original master for forming the optical device 1 shown in FIG. 1. With the aid of the surface of pits and protuberances structure composed of the pits 15a of the master disc 15, and via a replica substrate and a molding die described later, the structures of the optical device 1 is formed. Accordingly, the pits 15a of the master disc 15 are provided so as to form the quasi-hexagonal lattice pattern distorted in the circumferential direction of the master disc 15.

Next, the step of light exposure shown in FIG. 3C will be detailed referring to FIG. 5. An exposure apparatus shown in FIG. 5 is configured based on an optical disc recording device.

A laser unit 21 is a light source for irradiating the resist layer 12 deposited on the surface of the substrate 11, and is a unit for emitting far ultraviolet laser beam 13 at a wavelength of $\lambda=266$ nm. The laser beam 13 emitted from the laser unit 21 goes straight while keeping the state of parallel beam, and enters an electro-optical modulator (EOM) 22. In this embodiment, the electro-optical modulator 22, although generally used for reducing noise in laser beam sources, modulates the received laser beam 13 into a periodical or non-periodical wave having the amplitude thereof varying in a periodical or a non-periodical manner. The electro-optical modulator 22 modulates the incident laser beam 13 into a sine wave having the amplitude thereof varying in a periodical or a non-periodical manner. The variation in amplitude herein falls within a range of ±10% or around, with respect to the reference amplitude. The laser beam 13 transmitted through the electro-optical modulator (EOM) 22 is then reflected on the mirror 23, and guided to a modulation optical system 25.

A mirror 23 is composed of a polarizing beam splitter, which allows one polarization component to reflect thereon, and allows the other polarization component to transmit therethrough. The polarization component transmitted through the mirror 23 is received by a photodiode 24. The electro-optical modulator 22 is controlled by the received signal, and performs phase modulation of the laser beam 13.

In the modulation optical system, the laser beam 13 is condensed by a condenser lens 26 onto an acoustooptic modulator (AOM) typically composed of quartz ($SiO_2$). After being converted in the intensity by the acoustooptic modulator 27 and spread, the laser beam 13 is converted into a parallel beam. The laser beam 13 emitted from the modulation optical system 25 is reflected by a mirror 31, and guided to a moving optical table 32 in a horizontal and parallel manner.

The movable optical table 32 has a beam expander 33, mirror 34 and an objective lens 35. The laser beam 13 guided to the movable optical table 32 is shaped into a desired beam shape by the beam expander 33, and irradiated through the mirror 34 and the objective lens 35 to the resist layer 12 on the substrate 11. The substrate 11 is placed on a turntable (not shown) connected to a spindle motor 36. The step of light exposure for the resist layer 12 is carried out by intermittently irradiating the laser beam 13 onto the resist layer 12, while rotating the substrate 11, and moving the laser beam 13 in the direction of radius of rotation of the substrate 11. The latent images 12a formed will show a near-ellipsoidal shape having the longitudinal axis thereof in the circumferential direction, for example. Movement of the laser beam 13 is effected by moving the movable optical table 32 in the direction of arrow R.

The light exposure apparatus shown in FIG. 5 has a control mechanism for forming the latent images 12a in the resist layer 12, according to a two-dimensional pattern by the quasi-hexagonal lattice shown in FIG. 1B. The control mechanism has a formatter 29 and a driver 30. The formatter 29 has a polarity inversion unit which controls timing of irradiation of laser beam 13 to the resist layer 12. The driver 30 receives an output of the polarity inversion unit, and controls the acoustooptic modulator 27.

The control mechanism synchronizes track-by-track intensity modulation of the laser beam 13 by the acoustooptic modulator 27, speed of rotation of the spindle motor 36, and moving speed of the movable optical table 32 with each other, so as to ensure spatial linkage of the two-dimensional pattern of the latent images 12a. Rotation of the substrate 11 is controlled on the constant-angular-velocity (CAV) basis, for example. The patterning takes place under an appropriate number of rotation of the substrate 11 with the aid of the spindle motor 36, appropriate frequency modulation of laser beam intensity with the aid of the acoustooptic modulator 27, and an appropriate feeding pitch of the laser beam 13 with the aid of the movable optical table 32. Under such configuration, the latent images 12a according to the quasi-hexagonal lattice pattern are formed in the resist layer 12.

For an exemplary case, as shown in FIG. 1, when arrangement pitch (periodicity) P1 in the circumferential direction is adjusted to 330 nm, and arrangement pitch (periodicity) P2 in the direction approximately 60° (−60°) away from the circumferential direction is adjusted to 300 nm, the feeding pitch may be adjusted to 251 nm. Control signal of the polarity inversion unit is gradually varied so as to make the spatial frequency (pattern density of the latent images 12a, P1: 330 nm, P2: 300 nm) uniform. More specifically, the resist layer 12 is irradiated while varying the irradiation period of the laser beam 13 track-by-track, and frequency modulation of the laser beam 13 is carried out by the control mechanism so as to adjust arrangement pitch P1 in the individual tracks T is adjusted to approximately 330 nm. More specifically, the laser beam 13 is modulated so as to shorten the periodicity of irradiation as the position of the track becomes more distant from the center of the substrate. By this process, a nano-pattern having a spatial frequency uniform over the entire surface of the substrate may be formed. Frequency range for forming the nano-pattern falls in the range from 10 to 20 MHz, for example.

The patterned resist layer 12 after being developed has different levels of thickness in the radial direction and the circumferential direction of the substrate 11. The thickness of the patterned resist layer has a thickness in the circumferential direction smaller than the thickness in the radial direction. This is because the laser beam 13 is irradiated in the step of light exposure while rotating the substrate 11, so that the laser beam 13 is irradiated for longer time in circumferential direction than in the radial direction of the substrate, and this is expressed as difference in the thickness of the resist layer 12.

In the succeeding etching, the resultant pits 15a are given with geometrical anisotropy, depending on difference in the thickness of the resist layer 12 in the circumferential direction and the radial direction of the substrate 11.

An exemplary waveform of modulated laser beam for controlling the depth distribution of the structures will be explained, referring to FIG. 8A to 8G. The frequency range of the modulated laser beam falls in the range from several kilohertz to several tens of kilohertz, for example.

Figure 8A:
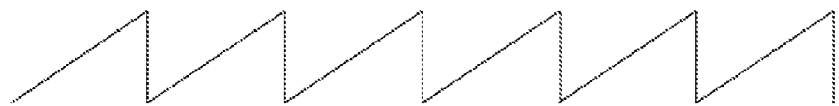
FIGS. 8A to 8G are schematic line drawings of modulated waveform of laser beam controlling depth of the structures.
Figure 8B:
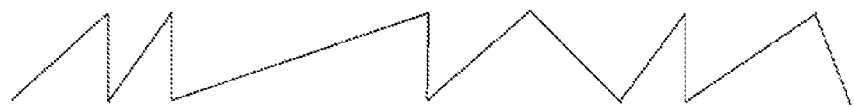

FIG. 8A and FIG. 8B show exemplary waveforms of modulated laser beam used for making the depth of the structures uniform. In order to obtain such modulated waveforms, the laser beam 13 may be modulated as follows. That is, the laser beam 13 is modulated by the electro-optical modulator 22 into a sawtooth wave or a triangle wave having the amplitude varying up to as much as ±10% in a periodical or non-periodical manner. The modulated laser beam 13 is guided to the modulation optical system 25.

Figure 8C:

FIG. 8C shows an exemplary waveform of modulated laser beam used for binarizing the depth distribution of the structures 3. In order to obtain such modulated waveform, the laser beam 13 may be modulated as follows. That is, the laser beam 13 is modulated by the electro-optical modulator 22 into a rectangular wave having the amplitude varying up to as much as ±10% in a periodical or non-periodical manner. The modulated laser beam 13 is guided to the modulation optical system 25.

Figure 8D:

FIG. 8D show an exemplary waveform of modulated laser beam used for binarizing the depth of the structures 3 while varying the ratio of population. In order to obtain such modulated waveform, the laser beam 13 may be modulated as follows. That is, the laser beam 13 is modulated by the electro-optical modulator 22 into a rectangular wave having the amplitude varying up to as much as ±10% in a periodical or non-periodical manner, and having the time width (pulse width) varying in a periodical or non-periodical manner.

Figure 8E:

FIG. 8E shows an exemplary waveform of modulated laser beam used for making the depth of the structures 3 distributed in a multi-valued manner. In order to obtain such modulated waveform, the laser beam 13 may be modulated as follows. That is, the laser beam 13 is modulated by the electro-optical modulator 22 into a multi-valued step wave.

Figure 8F:

FIG. 8F shows an exemplary waveform of modulated laser beam used for making the depth of the structures 3 distributed selectively in a multi-valued manner. In order to obtain such modulated waveform, the laser beam 13 is typically modulated as follows. That is, the laser beam 13 is modulated by the electro-optical modulator 22 into a selective multi-valued step wave (without center value).

Figure 8G:

FIG. 8G shows an exemplary waveform of modulated laser beam used for making the depth of the structures 3 distributed in a sectionally selective manner. In order to obtain such modulated waveform, the laser beam 13 may be modulated as follows. That is, the laser beam 13 is modulated by the electro-optical modulator 22 into a sectionally continuous wave (having no center region). This is obtained as an overlaid waveform of nano-sized moth-eye structure waveform and modulated laser waveform.

Next, the steps by which the optical device 1 is produced from the master disc 15 will be explained, referring to FIG. 6.
[Step of Manufacturing Replica Substrate]

Figure 6A:
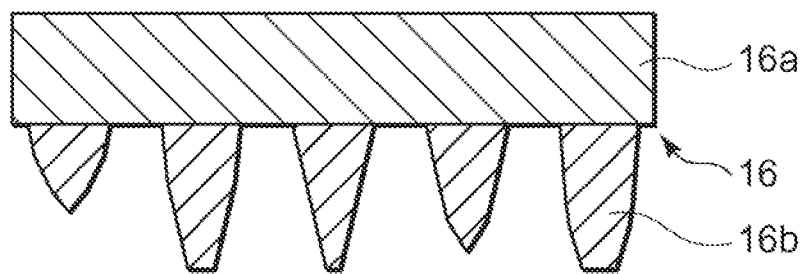
FIGS. 6A to 6C are schematic drawings explaining overall process of manufacturing the optical device based on the master disc.

A photo-curable resin such as a UV curable resin is coated on the surface, having the pits and protuberances structures formed thereon, of the master disc 15 produced described above, and thereon a transparent substrate 16a such as an acrylic plate is placed to be stacked thereon. The photo-curable resin is cured by irradiating ultraviolet radiation or the like, through the transparent substrate 16a, and then stripped from the master disc 15. By this process, structures 16b composed of the photo-curable resin are formed on one main surface of the transparent substrate 16a, as shown in FIG. 6A, so and then a replica substrate 16 is manufactured.

[Step of Producing Molding Die]

Figure 6B:
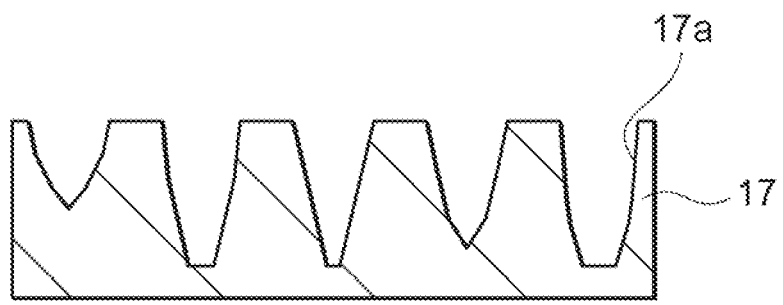

Next, an electro-conductive film is formed by electroless plating on the surface of the replica substrate 16 produced describe above, the surface having the pits and protuberances structure formed thereon, and a metal plated layer is formed by electrolytic plating. Nickel (Ni), for example, may be a material for composing the film formed by electroless plating and the layer formed by electrolytic plating. After the metal plated layer is formed, the metal plated layer is stripped from the replica substrate 16, and shaped for proper appearance if necessary. By this process, a molding die having pits 17a with a depth distribution formed on one main surface is manufactured, as shown in FIG. 6B.

[Step of Manufacturing Optical Device]

Figure 6C:
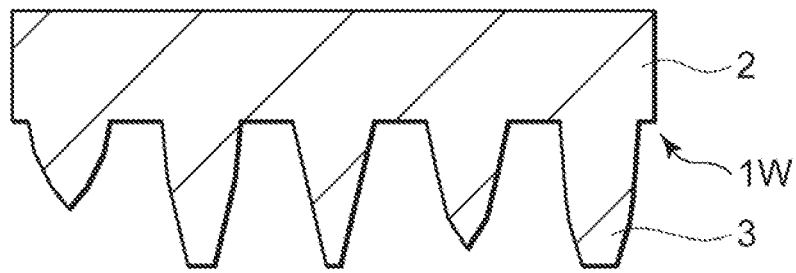

Next, thus-manufactured molding die 17 is set to a predetermined position of an injection molding machine, the die is closed to thereby form a cavity, and a molten resin such as polycarbonate is filled therein. Next, the molten resin is cooled, the die is opened, and the solidified resin is taken out. By this process, a disc-like substrate 1W having the structures 3 with a depth distribution, formed on one main surface of the base 2 to be integrated therewith as shown in FIG. 6C, is manufactured.

[Step of Cutting]

Figure 7A:
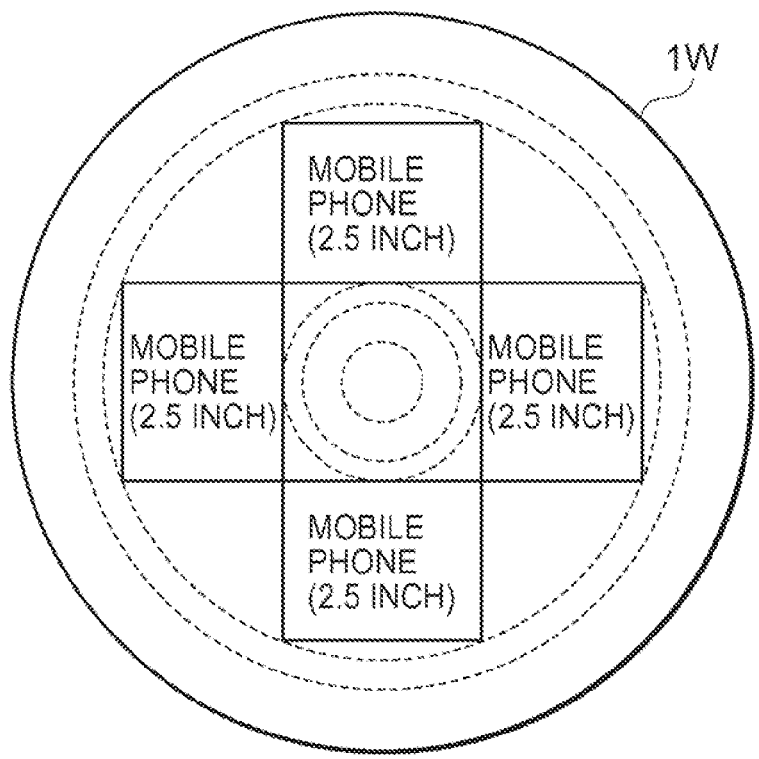
FIGS. 7A and 7B are schematic drawings explaining cutting processes of the optical device.
Figure 7B:
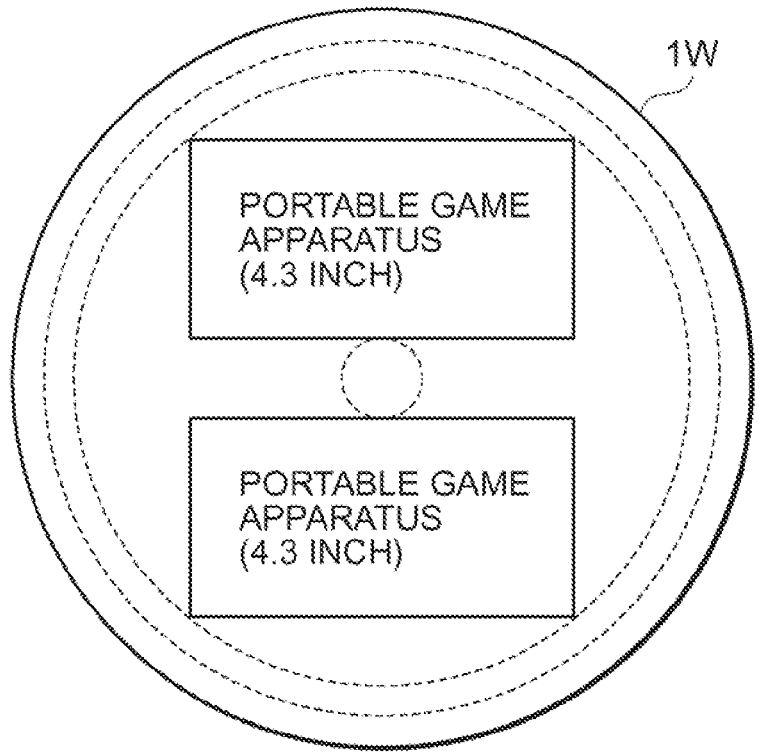

Next, the disc-like substrate 1W is cut according to a predetermined product size. For an exemplary case where the disc-like substrate 1W has a circle form of 200 mm in diameter, four optical devices 1 for mobile phones (2.5 inch wide, for example) may be cut out from a single disc-like substrate 1W as shown in FIG. 7A, or two optical devices 1 for mobile game machine (4.3 inch wide, for example) may be cut out from the disc-like substrate 1W as shown in FIG. 7B. By this process, the optical device 1 shown in FIG. 1 is manufactured.

The structures 3 are formed using an exposure apparatus, based on an exposure pattern formed in the resist layer 12 on the substrate 11, so that the optical devices 1, cut out from the disc-like substrate 1W into a predetermined size, will have the individual structures 3 aligned in a plurality of arc tracks T on the surface of the base 2.

According to the embodiments as described in the above, the depth distribution is provided to the structures 3 of the optical device 1, thereby reducing wavelength dependence of the reflection characteristics. Thus, an optical device having excellent anti-reflection characteristics may be obtained.

The master disc 15 may be manufactured using an exposure apparatuses assimilated to an optical disc recording device, so that the optical device 1 may efficiently be manufactured within a short time, and allows scale-up of the substrate 11. Thus, the productivity of manufacturing the optical device 1 may be improved.

When the structures 3 are provided so as to form a plurality of arc tracks, and those in three adjacent tracks form the quasi-hexagonal lattice pattern, the packing density of the structures 3 on the surface of the base 2 may be increased, so that an anti-reflective effect of the visible light may be enhanced. As a consequence, the optical device 1 having excellent anti-reflective characteristics and extremely high transmissivity may be provided.

Figure 18:
FIG. 18 is a drawing showing a configuration of a conventional Si master disc.
Figure 19:
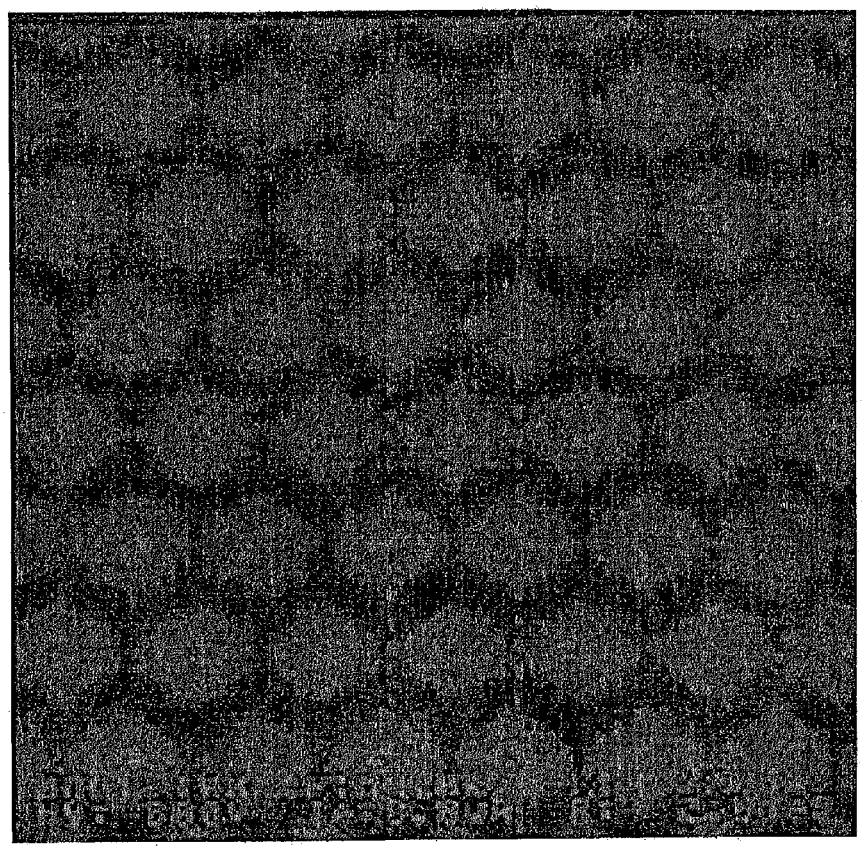
FIG. 19 is a drawing showing a configuration of a conventional Si master disc.
Figure 20:
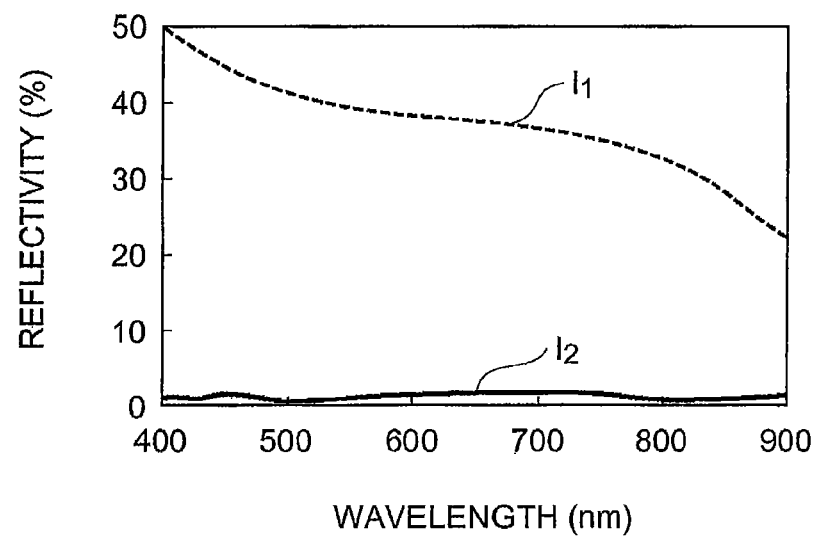
FIG. 20 is a graph showing relations between wavelength and reflectivity of a conventional Si master disc.
Figure 21:
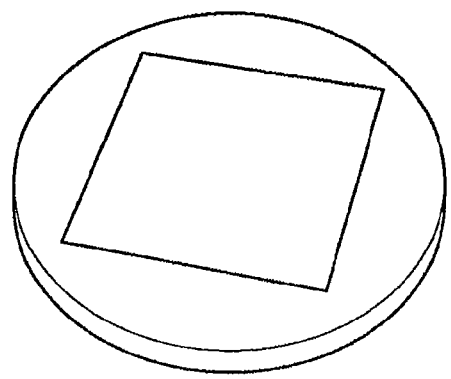
FIG. 21 is a drawing showing a configuration of a Ni-plated stamper of a conventional Si master disc.
Figure 22:
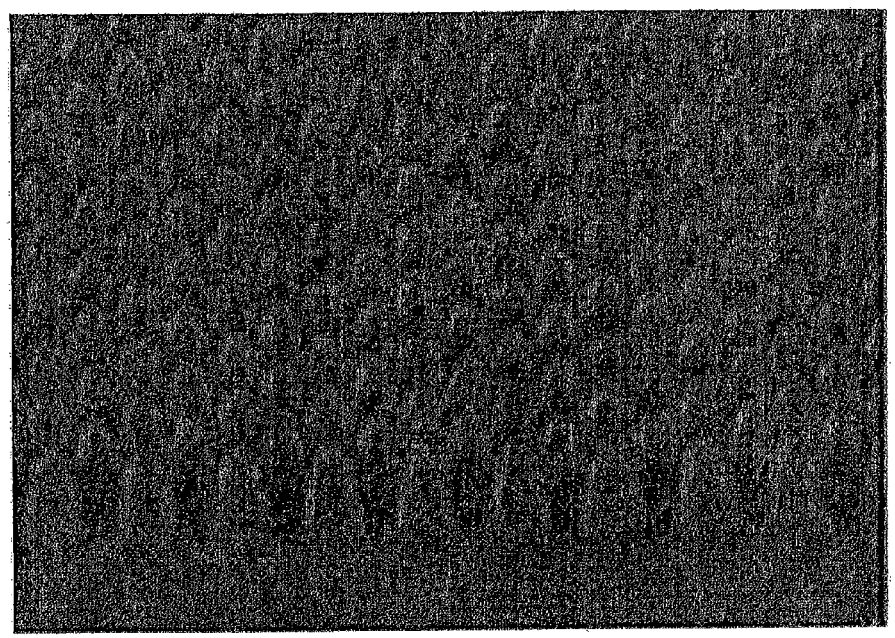
FIG. 22 is an enlarged view of the stamper shown in FIG. 17.
Figure 23:
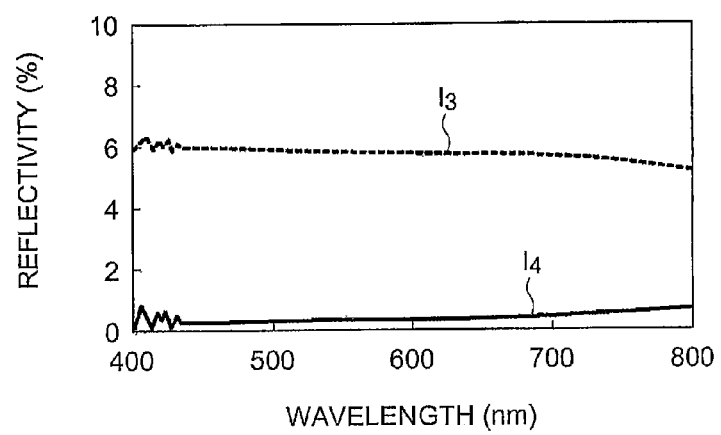
FIG. 23 is a graph showing relations between wavelength and reflectivity of a conventional optical device.

When the individual structures 3 are formed in a form of bell-like cones, the durability of the structures 3 may be improved as compared with the conventional tent-like fine sub-wavelength-wavelength structures shown in FIG. 18, and transferability of the individual pits and protuberances-structured surfaces of the replica substrate 16, molding die 17 and disc-like substrate 1W may be improved.

EXAMPLES

Paragraphs below will explain Examples without limiting the present application. In Examples, any constituents correspondent to those described in the above-described embodiments will be given with the same reference numerals.

In Examples 1 to 2 and Comparative Example 1 to 2, the depth distribution of the sub-wavelength structures 16b was examined.

Example 1

[Manufacture of Master Disc]

On the substrate 11, a chemical amplification or novolac-base positive resist layer 12 of approximately 150 nm thick was formed by coating, and the latent images 12a were formed in the resist layer 12 according to the quasi-hexagonal lattice pattern, using the exposure apparatus shown in FIG. 5. Wavelength of the laser beam 13 was 266 nm, and the laser power was adjusted to 0.50 mJ/m. The laser beam 13 was modulated by the electro-optical modulator 22 into a sine wave having the amplitude thereof non-periodically varying by ±10% or around, and then guided to the modulation optical system 25. Periodicity of irradiation of the laser beam 13 to the resist layer 12 was varied track-by-track. The resist layer 12 was then developed, to thereby manufacture the resist pattern having a quasi-hexagonal lattice pattern. Developing solution used herein was an inorganic alkali developing solution (from Tokyo Ohka Kogyo Co., Ltd.).

Next, a process of widening the diameter of opening by removing the resist pattern by $O_2$ ashing, and a process of etching the quartz substrate 11 by plasma etching in a $CHF_3$ gas atmosphere were alternatively repeated. As a consequence, the etching proceeded on the exposed surface of the quartz substrate 11 while gradually widening the diameter of the quasi-hexagonal lattice pattern, leaving the other regions masked by the resist pattern unetched, thereby the pits 15a having a bell-like elliptic cone shape as schematically shown in FIG. 4C, and having a depth distribution were formed. Amount of etching was varied based on etching time. Finally, the resist pattern was completely removed by $O_2$ ashing.

Details of the processes of ashing and etching will be explained below. The processes of (1) $O_2$ ashing for 4 seconds, $CHF_3$ etching for 1 minute, (2) $O_2$ ashing for 4 seconds, $CHF_3$ etching for 1.5 minutes, (3) $O_2$ ashing for 4 seconds, $CHF_3$ etching 2 minutes, (4) $O_2$ ashing for 4 seconds, $CHF_3$ etching for 3 minutes, (5) $O_2$ ashing for 4 seconds, $CHF_3$ etching for 4 minutes, and (6) $O_2$ ashing for 4 seconds, $CHF_3$ etching for 5 minutes were executed according to the order of (1) to (6). Finally, the resist pattern was completely removed by $O_2$ ashing for 10 seconds.

By these processes, the quartz master (master disc) 15, having a quasi-hexagonal lattice pattern of pits with arrangement pitch P1 in the circumferential direction of 330 nm, and arrangement pitch P2 in the direction approximately 60° away from the circumferential direction (about −60° direction) of 300 nm, was manufactured.

[Manufacture of Replica Substrate]

Next, a ultraviolet curing resin is coated on the quartz master 15 manufactured, and the acryl plate 16a was placed in close contact with the ultraviolet curing resin. The ultraviolet curing resin was cured by irradiating ultraviolet radiation, and then stripped from the quartz master 15. By these processes, the replica substrate 16 having the sub-wavelength structures 16b aligned according to the quasi-hexagonal lattice pattern, was manufactured.

Example 2

The replica substrate 16 was manufactured similarly to Example 1, except that the ashing time and etching time in the process of manufacturing the quartz master (master disc) 15 were varied.

Details of the processes of ashing and etching will be explained below. The processes of (1) $O_2$ ashing for 4 seconds, $CHF_3$ etching for 1 minute, (2) $O_2$ ashing for 4 seconds, $CHF_3$ etching for 2 minutes, (3) $O_2$ ashing for 4 seconds, $CHF_3$ etching for 3 minutes, (4) $O_2$ ashing for 4 seconds, $CHF_3$ etching for 4 minutes, (5) $O_2$ ashing for 4 seconds, $CHF_3$ etching for 3 minutes, (6) $O_2$ ashing for 4 seconds, $CHF_3$ etching for 2 minutes, (7) $O_2$ ashing for 4 seconds, $CHF_3$ etching for 1 minute were executed according to the order of (1) to (7). Finally, the resist pattern was completely removed by $O_2$ ashing for 10 seconds.

Comparative Example 1

The replica substrate 16 was manufactured similarly to Example 2, except that the laser beam was modulated by the electro-optical modulator 22 into a sine wave having a constant amplitude.

Comparative Example 2

The replica substrate 16 was manufactured similarly to Example 1, except that the laser beam was modulated by the electro-optical modulator 22 into a sine wave having a constant amplitude.

(Shape Evaluation)

The replica substrates manufactured as described in the above in Example 1, Comparative Example 1 and Comparative Example 2 were observed under a scanning electron microscope (SEM). Results are shown in FIG. 9 to FIG. 11.

Figure 9:
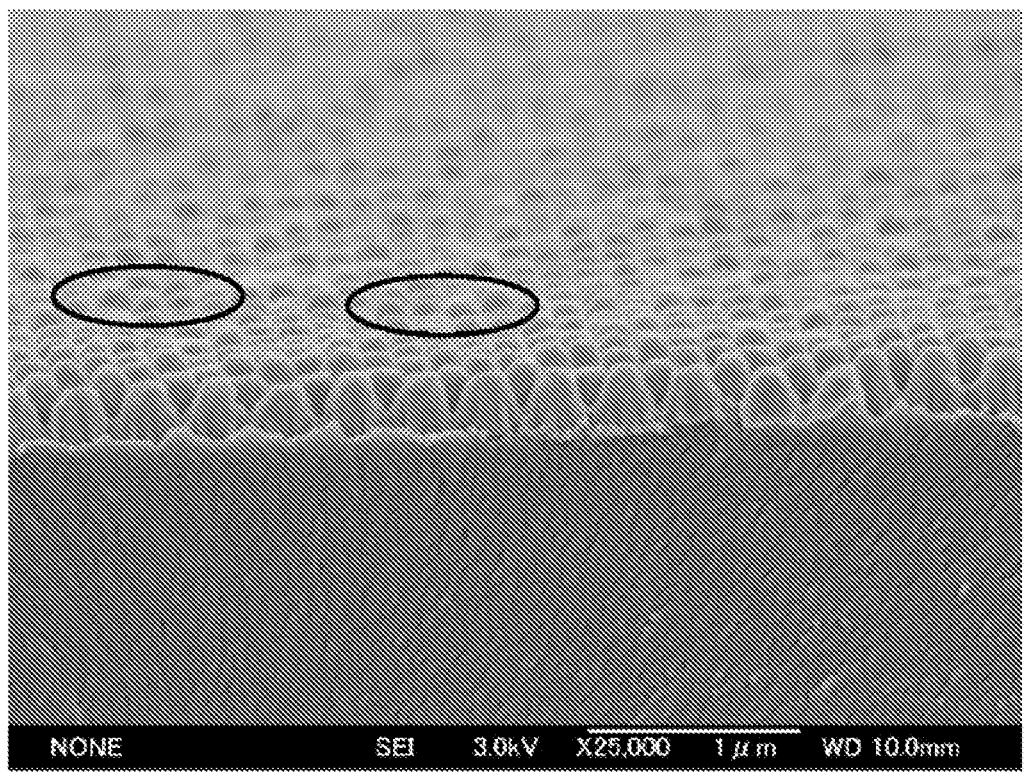
FIG. 9 is a drawing showing a SEM image of the replica substrate in Example 2.
Figure 10:
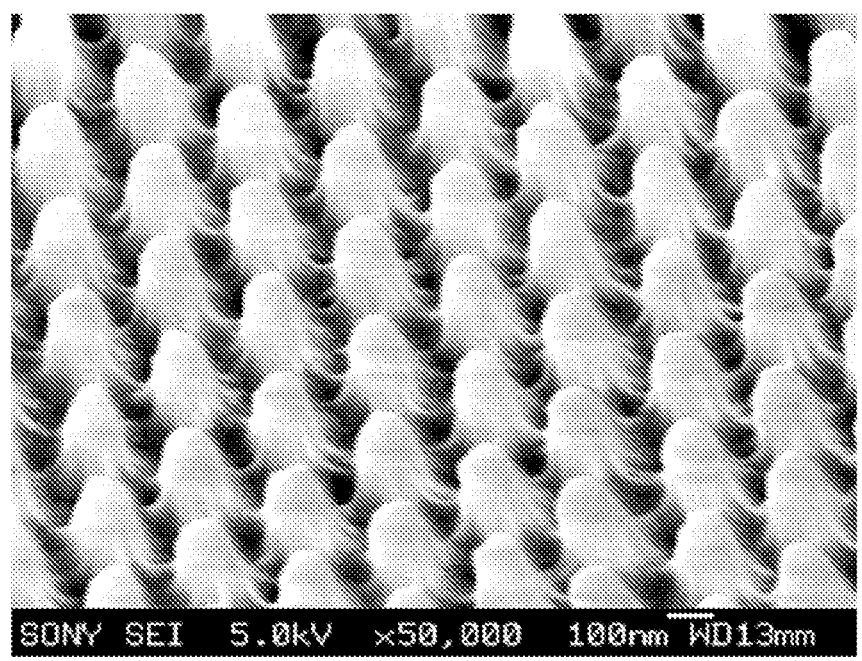
FIG. 10 is a drawing showing a SEM image of the replica substrate in Comparative Example 1.
Figure 11:
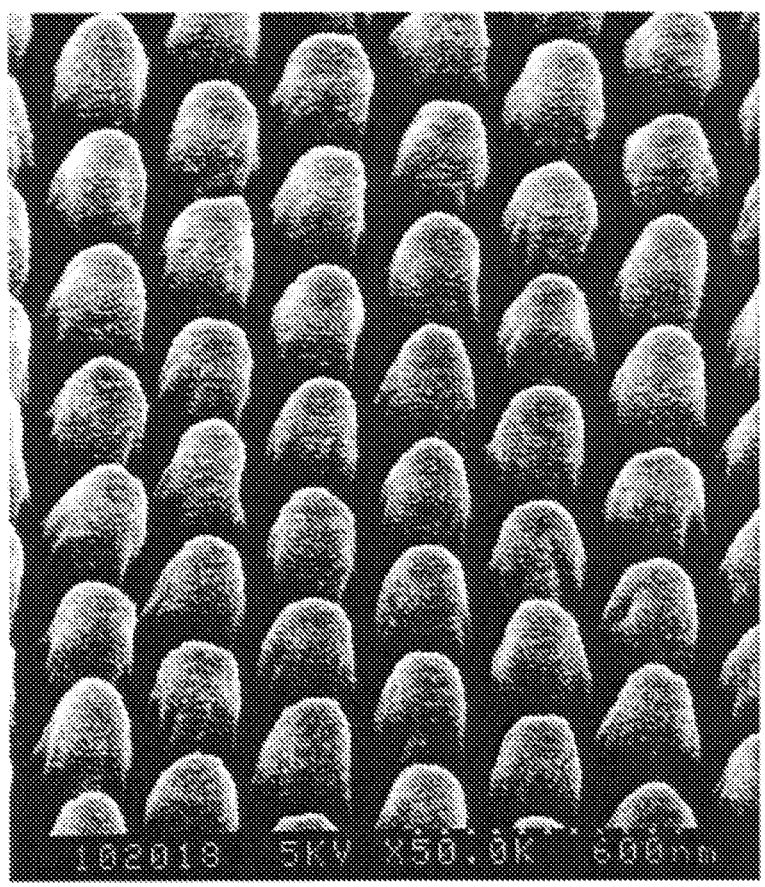
FIG. 11 is a drawing showing a SEM image of the replica substrate in Comparative Example 2.

FIG. 9 to FIG. 11 illustrates the following.

(1) The replica substrate 16 having the sub-wavelength structures 3 formed on one main surface may be manufactured using an exposure apparatus assimilated to an optical disc recording device (see FIG. 9 to FIG. 11).

(2) The sub-wavelength structures 3 having the elliptic cone shape may be manufactured according to a quasi-hexagonal lattice pattern, by varying periodicity of irradiation of laser beam 13 to the resist layer 12 track-by-track (see FIG. 9 to FIG. 11).

(3) The sub-wavelength structures 3 without depth distribution may be obtained by modulating the laser beam 13 into a sine wave having a constant amplitude (see FIG. 10, FIG. 11), whereas the sub-wavelength structures 3 having a depth distribution may be obtained by modulating the laser beam 13 into a sine wave having an amplitude non-periodically varying by ±10% or around (see the region marked with a circle in FIG. 9).

(4) The sub-wavelength structures 3 may be shaped in an elliptic cone shape having the slope moderate at the center and gradually becomes steeper from the top towards the bottom, by alternatively repeating ashing and etching in the process of etching the quartz master, and by gradually increasing the etching time (see FIG. 9 to FIG. 11).

The replica substrates manufactured as described above in Examples 1, 2 and Comparative Examples 1, 2 were observed under an atomic force microscope (AFM). The depth (height) of the sub-wavelength structures 16b of the individual replica substrates were determined based on sectional profile observed under the AFM. Results are shown in Table 1.

The depth of the sub-wavelength structures 16b was represented by the depth in the radial direction, because the depth of the sub-wavelength structures 16b in the circumferential direction was found to be smaller than the depth in the radial direction, and the depth of portions, other than those fallen on the circumferential direction, of the sub-wavelength structures 16b was found to be almost equal to the depth in the radial direction.

Mean periodicity P may be defined by the equation (1) below:

$$\text{Mean Periodicity } P=(P1+P2+P2)/3=(330+300+300)/3=310 \quad (1)$$

TABLE 1

|  | Example 1 | Example 2 | Comparative Example 1 | Comparative Example 2 |
| --- | --- | --- | --- | --- |
| Etching time | 16.5 min | 16 min | 16 min | 16.5 min |
| Height of protuberance H | 282-435 nm | 289-375 nm | 351 nm | 375 nm |
| Arrangement pitch P1 | 330 nm | 330 nm | 330 nm | 330 nm |
| Arrangement pitch P2 | 300 nm | 300 nm | 300 nm | 300 nm |
| Mean periodicity P | 310 nm | 310 nm | 310 nm | 310 nm |
| Aspect ratio (H/P) | 0.91-1.40 | 0.93-1.21 | 1.13 | 1.21 |

Mean Periodicity P = (P1 + P2 + P2)/3

Table 1 teaches the followings. The shape of the sub-wavelength structures 3 may be modified by varying the etching time. It is therefore understood that the optical device 1 having desired characteristics may be manufactured by varying the etching time.

(Evaluation of Reflective Characteristics)

Reflectivity of the replica substrates manufactured described above of Examples 1, 2 and Comparative Examples 1, 2 were measured. The reflectivity was measured using a UV/visible spectrophotometer (Model V-500 from JASCO Corporation). Results are shown in FIG. 12 to FIG. 15.

FIG. 12 to FIG. 15 teaches the following with respect to the reflection characteristics of each of Examples 1, 2 and Comparative Examples 1, 2.

Figure 12:
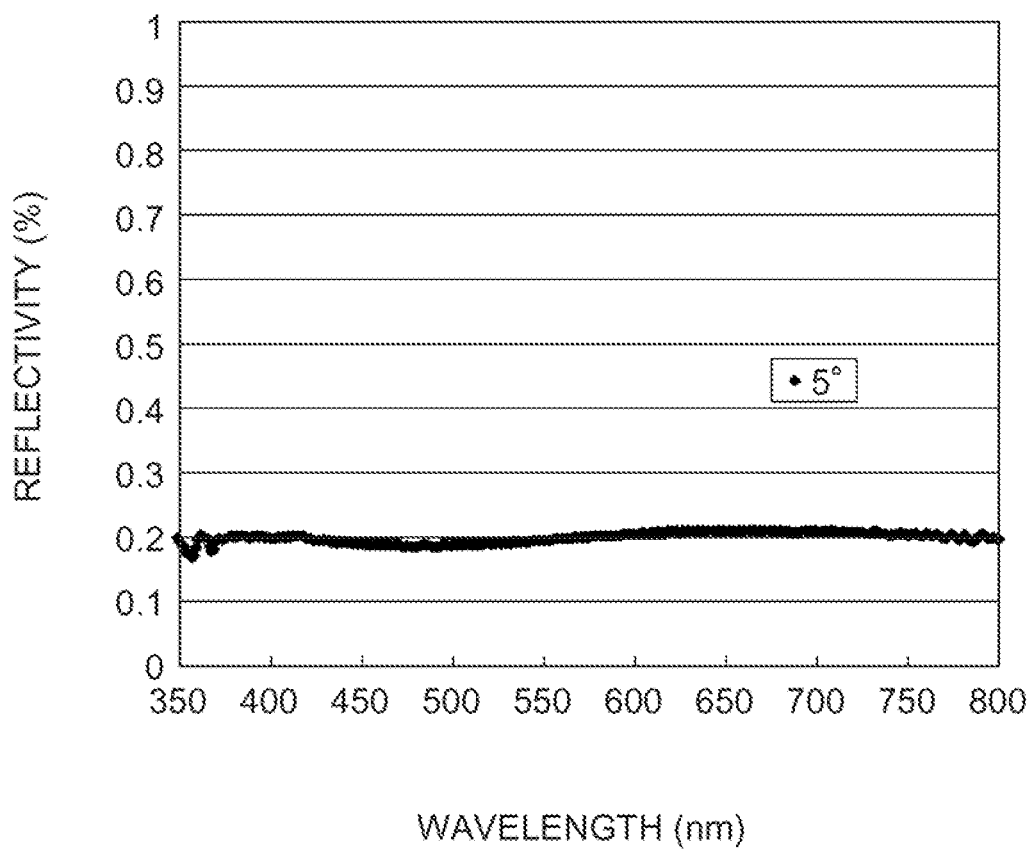
FIG. 12 is a graph showing reflection characteristics in Example 1.

(b) Reflection Characteristics of Example 1 (see FIG. 12)

Example 1 showed almost no wavelength dependence of reflectivity (over the range from 350 nm to 800 nm), with a variation of reflectivity of only as small as 0.04% pp or below.

The reflectivity was 0.2% or around, and maximum reflectivity was 0.22% or lower, proving an excellent non-reflective performance.

Figure 13:
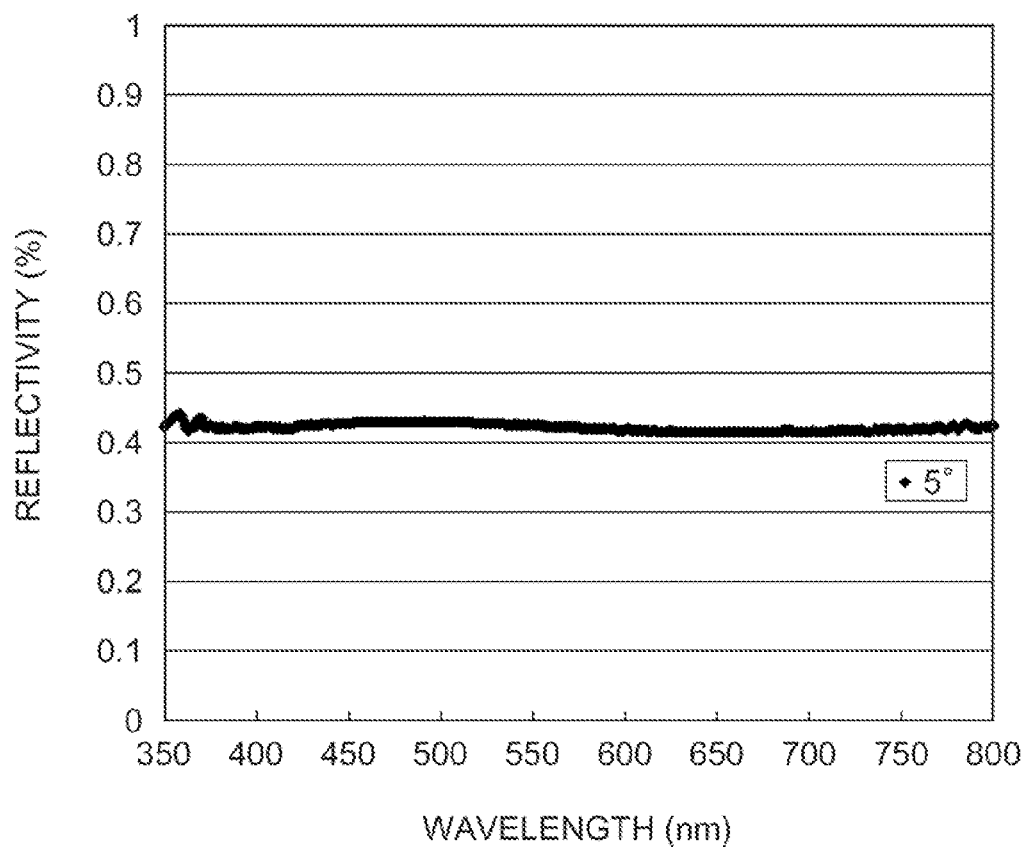
FIG. 13 is a graph showing reflection characteristics in Example 2.

(a) Reflection Characteristics of Example 2 (see FIG. 13)

Example 2 showed almost no wavelength dependence of reflectivity (over the range from 350 nm to 800 nm), with a variation of reflectivity of only as small as 0.1% pp or below. The reflectivity was 0.35% or around, and maximum reflectivity was 0.4% or lower, proving a good non-reflective performance.

Figure 14:
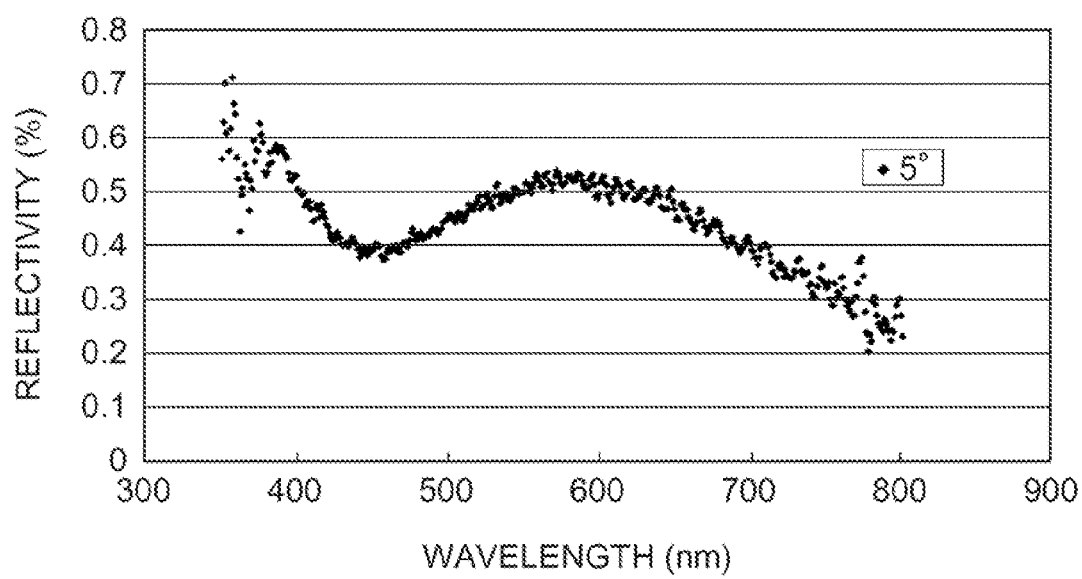
FIG. 14 is a graph showing a reflection characteristics in Comparative Example 1.

(c) Reflection Characteristics of Comparative Example 1 (see FIG. 14)

Comparative Example 1 showed wavelength dependence of reflectivity (over the range from 350 nm to 800 nm), showing a sine waveform with an extremely small amplitude as the wavelength increases. The reflectivity was found to be 0.2% to 0.7% or around.

Figure 15:
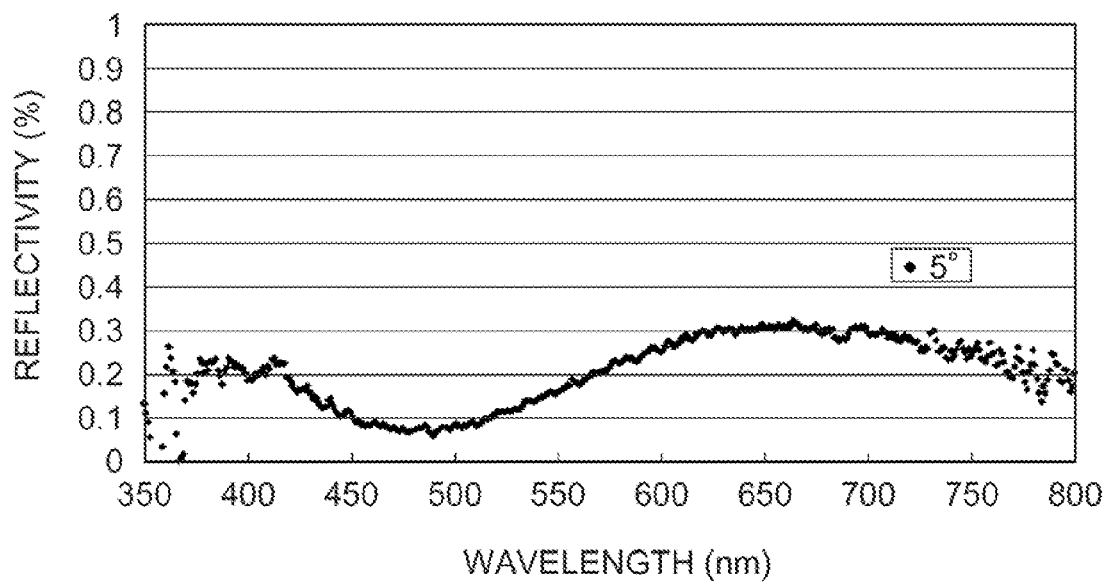
FIG. 15 is a graph showing a reflection characteristics in Comparative Example 2.

(d) Reflection Characteristics of Comparative Example 2 (see FIG. 15)

Comparative Example 2 showed wavelength dependence of reflectivity (over the range from 350 nm to 800 nm), showing a sine waveform with an extremely small amplitude as the wavelength increases. The mean reflectivity was 0.2%, maximum reflectivity was 0.3%, and minimum reflectivity was 0.1%.

As judged from the above, wavelength dependence of reflectivity may be reduced by providing some depth distribution to the sub-wavelength structure 16b. In view of reducing the wavelength dependence of reflectivity, and of obtaining more desirable anti-reflective characteristics, the aspect ratio preferably falls in the range from 0.91 to 1.41.

The non-reflective performances of Examples 1 and 2 have not been achieved by existing antireflection technology. That is, the replica substrates 16 of Examples 1 and 2 have remarkable anti-reflective performances.

In Example 3, a molding die 17 was produced using the replica substrate 16, and the optical device 1 was manufactured using the obtained molding die 17.

Example 3

[Production of Master Disc and Replica substrate]

The master disc and the replica substrate were produced similarly to as described in Example 1, to thereby obtain the replica substrate 16.

[Production of Molding Die]

Next, an electro-conductive film composed of a nickel film was formed on the pattern of pits and protuberances of the replica substrate produced by electroless plating. The replica substrate having the electro-conductive film thus formed thereon was set to an electroforming apparatus, and a nickel plated layer of 300±5 μm thick or around was formed by electro-plating on the electro-conductive film. The nickel plated layer was then stripped from the replica substrate using a cutter or the like, the surface of the transferred pits and protuberances structure was cleaned with acetone, to thereby produce the Ni metal master (molding die) 17 having the pits aligned according to the quasi-hexagonal lattice pattern.

[Manufacture of Optical Device]

Next, using the Ni metal master 17 produced, an injection-molded substrate made of polycarbonate resin was manufactured, to thereby obtain a disc-like substrate 1W having on the surface thereof the pits aligned according to the quasi-hexagonal lattice pattern. The disc-like substrate 1W was then cut into a predetermined size, to thereby manufacture the optical device 1.

(Evaluation of Optical Device)

The optical device 1 manufactured as described in the above was observed under a scanning electron microscope (SEM). It was found that the sub-wavelength structures 3 having the shape and arrangement same as those in Example 1 were formed on the surface of the base 2.

Reflective characteristics of the optical device 1 manufactured as described in the above were evaluated similarly to as described in Example 1. The results taught that Example 3 gave reflective characteristics similar to those in Example 1.

In Referential Example 1 to 9, the depth distribution of sub-wavelength structures 3 was examined by a RCWA (rigorous coupled wave analysis) simulation.

Referential Example 1

Figure 16:
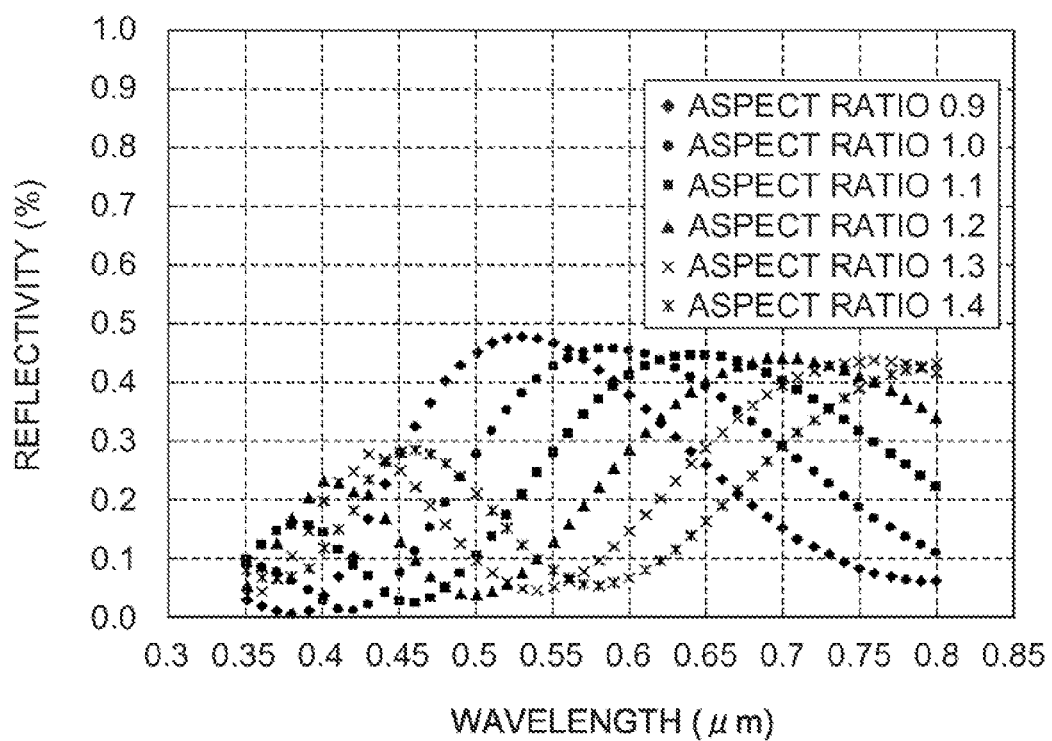
FIG. 16 is a graph showing results of RCWA simulation in Referential Examples 1 to 6.

The optical device provided with the sub-wavelength structures 3 having a bell-like elliptic cone shape but no depth distribution was examined by RCWA simulation. Results are shown in FIG. 16. Arrangement pitch P1 in the circumferential direction was set to 325 nm, arrangement pitch P2 in the direction approximately 60° away from the circumferential direction (about −60° direction) was set to 300 nm, and the aspect ratio was set to 0.9.

Referential Example 2 to 6

RCWA simulation was carried out similarly to as described in Referential Example 1, except that the aspect ratio was varied among 1.0, 1.1, 1.2, 1.3 and 1.4. Results are shown in FIG. 16.

Referential Example 7

Figure 17:
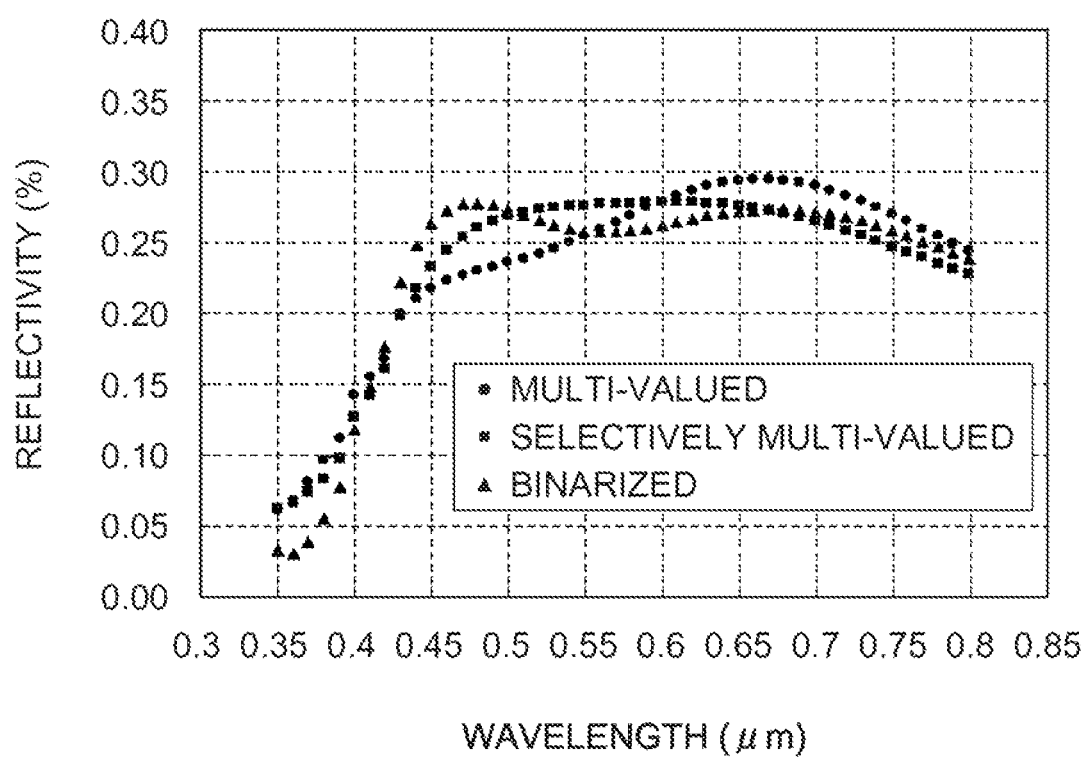
FIG. 17 is a graph showing results of RCWA simulation in Referential Examples 7 to 9.

The optical device provided with the sub-wavelength structures 3 having a bell-like elliptic cone shape with a depth distribution was examined by RCWA simulation. Arrangement pitch P1 in the circumferential direction was set to 325 nm, arrangement pitch P2 in the direction approximately 60° away from the circumferential direction (about −60° direction) was set to 300 nm, and the aspect ratio was set in two ways such as 0.9 and 1.3, in order to binarize the depth distribution. Results are shown in FIG. 17.

Referential Example 8

RCWA simulation was carried out similarly to as described in Referential Example 7, except that the aspect ratio was varied among 0.8, 0.9, 1.0, 1.1, 1.2, 1.3 and 1.4, so as to make the depth of the sub-wavelength structures 3 distributed in a multi-valued manner. Results are shown in FIG. 17.

Referential Example 9

RCWA simulation was carried out similarly to as described in Referential Example 7, except that the aspect ratio was varied among 0.8, 0.9, 1.0, 1.1, 1.2, 1.3 and 1.4, so as to make the depth of the sub-wavelength structures 3 distributed in a selective multi-valued manner. Results are shown in FIG. 17.

FIG. 16 to FIG. 17 teach the followings.

(a) Referential Example 1 showed no increase in the reflectivity in the longer wavelength region as shown in FIG. 16. The wavelength dependence of the reflectivity, or the wavelength dependence of the sine wave with an extremely small amplitude varies depending on the depth of the sub-wavelength structures 3 having a bell-like elliptic cone shape.

(b) Referential Example 2 showed no increase in the reflectivity in the longer wavelength region, and can eliminate wavelength dependence of reflectivity.

Considering the above, it is understood that the results of RCWA simulation of the optical device 1 and results of measurement of the actually-manufactured optical device 1 or the replica substrate 16 showed almost same tendency.

Embodiments and Examples of the present application have specifically been explained in the above, without limiting the present application, and instead allow various modifications based on the technical spirit of the present application.

For example, numerical values shown in the above-described embodiments and Examples are merely for the exemplary purposes, wherein use of any other values differed therefrom may be permissible if necessary.

The embodiments and Examples described in the above dealt with the case where the substrate is etched to produce the master disc, whereas the substrate having the resist layer patterned thereon may directly be applied as the master disc.

The embodiments and Example described in the above dealt with the case where the structures have a shape of protuberance, whereas the structures may have a shape of pit. Even this case will raise effects similar to those in the embodiments and Examples described in the above.

It is still also allowable that, in the embodiments and Examples described in the above, the depth distribution of the structures may be given on the surface of the base, as being varied among at least two or more levels of values in a selective, or a continuous, or a sectionally continuous manner, with weighed probability of population for the respective depth.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical device comprising:
   a base;
   a plurality of structures arranged at a fine pitch equal to or shorter than a wavelength of visible light on a surface of the base and that have an anti-reflective characteristic, each structure being composed of a protuberance or a pit; and
   wherein the structures have a depth distribution including at least two heights of protuberances or at least two heights of pits, and
   wherein a bottom portion of each structure has an elliptic shape having a major axis and a minor axis shorter than and perpendicular to the major axis.

2. The optical device as claimed in claim 1, wherein each structure has an elliptic cone or truncated elliptic cone shape having a moderate slope at a top portion and a gradually steeping slope toward the bottom portion.

3. The optical device as claimed in claim 1, wherein the structures are arranged to form a plurality of arc tracks on the surface of the base.

4. The optical device as claimed in claim 3, wherein the elliptic cone or truncated elliptic cone shape has the major axis in a circumferential direction of the arc tracks.

5. The optical device as claimed in claim 3, wherein the structures form a quasi-hexagonal lattice pattern in adjacent arc tracks.

6. The optical device as claimed in claim 3, wherein an arrangement pitch of the structures in a same arc track is longer than an arrangement pitch of the structures in two adjacent arc tracks.

7. The optical device as claimed in claim 3, wherein the structures in the circumferential direction of the arc tracks have a depth smaller than that of the structures in a radial direction of the arc tracks.

8. The optical device as claimed in claim 1, wherein the depth distribution of the structures is provided by varying in a selective manner using at least two or more values, in a continuous manner, or in a sectionally continuous manner, over the surface of the substrate.

9. The optical device as claimed in claim 1, wherein the depth distribution of the structures is provided by varying in a step function, over the surface of the substrate.

10. The optical device as claimed in claim 1, wherein the depth distribution of the structures is provided by varying in a step function over the surface of the substrate, and the structures are selectively formed so that ratio of population of at least one or more types of structures differs from ratio of population of the other types of structures.

11. The optical device of claim 1, wherein the optical device is selected from the group consisting of a display, an optoelectronic device, an optical communication device, an optical fiber, a solar cell, a lighting device, and a guiding plate.

12. The optical device of claim 1, wherein the base is a transparent base.

13. The optical device of claim 12, wherein the transparent base includes a material selected from the group consisting of a transparent synthetic resin, polycarbonate, polyethylene terephthalate, and glass.

14. The optical device of claim 1, wherein the base has a shape selected from the group consisting of a film, a sheet, a plate, and a block.

15. A replica substrate for producing an optical element, the optical element comprising:
   a base;
   a plurality of structures arranged at a fine pitch equal to or shorter than a wavelength of visible light on a surface of the base and that have an anti-reflective characteristic, each structure being composed of a protuberance or a pit, and
   wherein the structures have a depth distribution including at least two heights of protuberances or at least two heights of pits, and
   wherein a bottom portion of each structure has an elliptic shape having a major axis and a minor axis shorter than and perpendicular to the major axis.

16. The replica substrate of claim 15, wherein the optical element is incorporated in an optical device selected from the group consisting of a display, an optoelectronic device, an optical communication device, an optical fiber, a solar cell, a lighting device, and a guiding plate.

17. The replica substrate of claim 15, wherein the base is a transparent base.

18. The replica substrate of claim 17, wherein the transparent base includes a material selected from the group consisting of a transparent synthetic resin, polycarbonate, polyethylene terephthalate, and glass.

19. The replica substrate of claim 15, wherein the base has a shape selected from the group consisting of a film, a sheet, a plate, and a block.

* * * * *